United States Patent
Ghatare et al.

(10) Patent No.: US 9,881,025 B2
(45) Date of Patent: Jan. 30, 2018

(54) IDENTIFYING PRODUCT METADATA FROM AN ITEM IMAGE

(71) Applicant: eBay Inc., San Jose, CA (US)

(72) Inventors: Sanjay Pundlkrao Ghatare, San Jose, CA (US); Ali Dasdan, San Jose, CA (US); Naren Chittar, San Jose, CA (US)

(73) Assignee: eBay Inc., San Jose, CA (US)

( * ) Notice: Subject to any disclaimer, the term of this patent is extended or adjusted under 35 U.S.C. 154(b) by 154 days.

(21) Appl. No.: 14/983,458

(22) Filed: Dec. 29, 2015

(65) Prior Publication Data

US 2016/0110385 A1  Apr. 21, 2016

Related U.S. Application Data

(63) Continuation of application No. 14/255,735, filed on Apr. 17, 2014, now Pat. No. 9,256,618, which is a continuation of application No. 13/028,019, filed on Feb. 15, 2011, now Pat. No. 8,750,557.

(51) Int. Cl.

| | |
|---|---|
| *G06K 9/00* | (2006.01) |
| *G06F 17/30* | (2006.01) |
| *G06Q 30/02* | (2012.01) |
| *G06T 7/11* | (2017.01) |
| *G06T 7/162* | (2017.01) |
| *G06T 7/90* | (2017.01) |
| *G06T 7/194* | (2017.01) |

(52) U.S. Cl.
CPC .. *G06F 17/30253* (2013.01); *G06F 17/30259* (2013.01); *G06Q 30/02* (2013.01); *G06T 7/11* (2017.01); *G06T 7/162* (2017.01); *G06T 7/194* (2017.01); *G06T 7/90* (2017.01); *G06T 2207/10024* (2013.01)

(58) Field of Classification Search
CPC combination set(s) only.
See application file for complete search history.

(56) References Cited

U.S. PATENT DOCUMENTS

| | | | |
|---|---|---|---|
| 5,937,081 | A | 8/1999 | O'brill et al. |
| 6,592,972 | B1 | 7/2003 | Trantoul |
| 6,614,924 | B1 | 9/2003 | Aghajan |

(Continued)

OTHER PUBLICATIONS

"U.S. Appl. No. 13/028,019, Examiner Interview Summary dated Jun. 6, 2013", 3 pgs.

(Continued)

*Primary Examiner* — Alex Liew

(74) *Attorney, Agent, or Firm* — Schwegman Lundberg & Woessner, P.A.

(57) ABSTRACT

A metadata extraction machine accesses an image that depicts an item. The item depicted in the image may have an attribute that describes a characteristic of the item and an attribute descriptor that corresponds to the attribute of the item and specifies a value of the attribute. The metadata extraction machine performs an analysis of the image. The analysis may include identifying the attribute descriptor corresponding to the attribute based on image segmentation of the image. The metadata extraction machine transmits a communication to a device of a user based on the identifying of the attribute descriptor corresponding to the attribute of the item depicted in the image.

20 Claims, 9 Drawing Sheets

(56) References Cited

U.S. PATENT DOCUMENTS

| | | |
|---|---|---|
| 7,813,539 B2 | 10/2010 | Shibuya et al. |
| 7,925,885 B2 | 4/2011 | Zhelev |
| 8,750,557 B2 | 6/2014 | Ghatare et al. |
| 9,256,618 B2 * | 2/2016 | Ghatare ............ G06F 17/30253 |
| 2005/0286743 A1 | 12/2005 | Kurzweil et al. |
| 2006/0280331 A1 | 12/2006 | Chosson et al. |
| 2006/0287877 A1 | 12/2006 | Wannier et al. |
| 2007/0110271 A1 | 5/2007 | Beretta |
| 2007/0291988 A1 | 12/2007 | Karimov et al. |
| 2008/0002882 A1 | 1/2008 | Voloshynovskyy et al. |
| 2008/0082426 A1 * | 4/2008 | Gokturk ............ G06F 17/30256 705/26.62 |
| 2012/0134593 A1 * | 5/2012 | Becker ............... G06K 9/00979 382/195 |
| 2012/0207389 A1 | 8/2012 | Ghatare et al. |
| 2014/0226910 A1 | 8/2014 | Ghatare et al. |

OTHER PUBLICATIONS

"U.S. Appl. No. 13/028,019, Final Office Action dated Sep. 17, 2013", 12 pgs.

"U.S. Appl. No. 13/028,019, Non Final Office Action dated Mar. 13, 2013", 12 pgs.

"U.S. Appl. No. 13/028,019, Notice of Allowance dated Jan. 30, 2014", 8 pgs.

"U.S. Appl. No. 13/028,019, Response filed Jun. 13, 2013 to Non Final Office Action dated Mar. 13, 2013", 15 pgs.

"U.S. Appl. No. 13/028,019; Response filed Jan. 17, 2014 to Final Office Action dated Sep. 17, 2013", 16 pgs.

"U.S. Appl. No. 14/255,735, Examiner Interview Summary dated Feb. 26, 2015", 3 pgs.

"U.S. Appl. No. 14/255,735, Non Final Office Action dated May 15, 2015", 18 pgs.

"U.S. Appl. No. 14/255,735, Non Final Office Action dated Nov. 14, 2014", 10 pgs.

"U.S. Appl. No. 14/255,735, Notice of Allowance dated Sep. 30, 2015", 10 pgs.

"U.S. Appl. No. 14/255,735, Preliminary Amendment filed Apr. 28, 2014", 9 pgs.

"U.S. Appl. No. 14/255,735, Response filed Feb. 16, 2015 to Non Final Office Action dated Nov. 14, 2014", 13 pgs.

"U.S. Appl. No. 14/255,735, Response filed Sep. 15, 2015 to Non Final Office Action dated May 15, 2015", 21 pgs.

\* cited by examiner

IDENTIFYING PRODUCT METADATA FROM AN ITEM IMAGE

RELATED APPLICATION

This application is a continuation of and claims the benefit of priority under 35 U.S.C. § 120 to U.S. patent application Ser. No. 13/028,019, entitled "IDENTIFYING PRODUCT METADATA FROM AN ITEM IMAGE," filed on Feb. 15, 2011, which is hereby incorporated by reference herein in its entirety.

This application is a continuation of and claims the benefit of priority under 35 U.S.C. § 120 to U.S. patent application Ser. No. 14/255,735, entitled "IDENTIFYING PROHIBITED INFORMATION WITHIN AN ITEM IMAGE," filed on Apr. 17, 2014, which is hereby incorporated by reference herein in its entirety.

TECHNICAL FIELD

The subject matter disclosed herein generally relates to the processing of data. Specifically, the present disclosure addresses systems and methods of identifying product metadata from an item image.

BACKGROUND

An image may depict an item, and the depicted item may be a specimen of a product available for purchase. For example, a product may be available for purchase from a seller, and the seller may use an image of the item to merchandise the item, the product, or both. The seller may be a business entity (e.g., a manufacturer, a wholesaler, or a retailer of the product) or an individual person. The product may take the form of a good or a service. Examples of goods include physical items (e.g., a digital camera or a car) and information items (e.g., downloaded data). Examples of services include human services (e.g., contracted work) and automated services (e.g., subscriptions). Other examples of products include authorizations (e.g., access to services, licenses, or encryption keys).

In merchandising an item, the seller may provide an image of the item (e.g., an item image) to a network-based system so that the network-based system may present the image to a user of the network-based system (e.g., a potential buyer of the item). Examples of network-based systems include commerce systems (e.g., shopping websites), a publication systems (e.g., classified advertisement websites), listing systems (e.g., auction websites), and transaction systems (e.g., payment websites). The image of the item may be presented within a document (e.g., a webpage) describing the item, a search result referencing the item, a listing for the item (e.g., within a list of items available for purchase), a review of the item, a comment on the item, or any suitable combination thereof.

BRIEF DESCRIPTION OF THE DRAWINGS

Some embodiments are illustrated by way of example and not limitation in the figures of the accompanying drawings in which.

DETAILED DESCRIPTION

Figure 1:
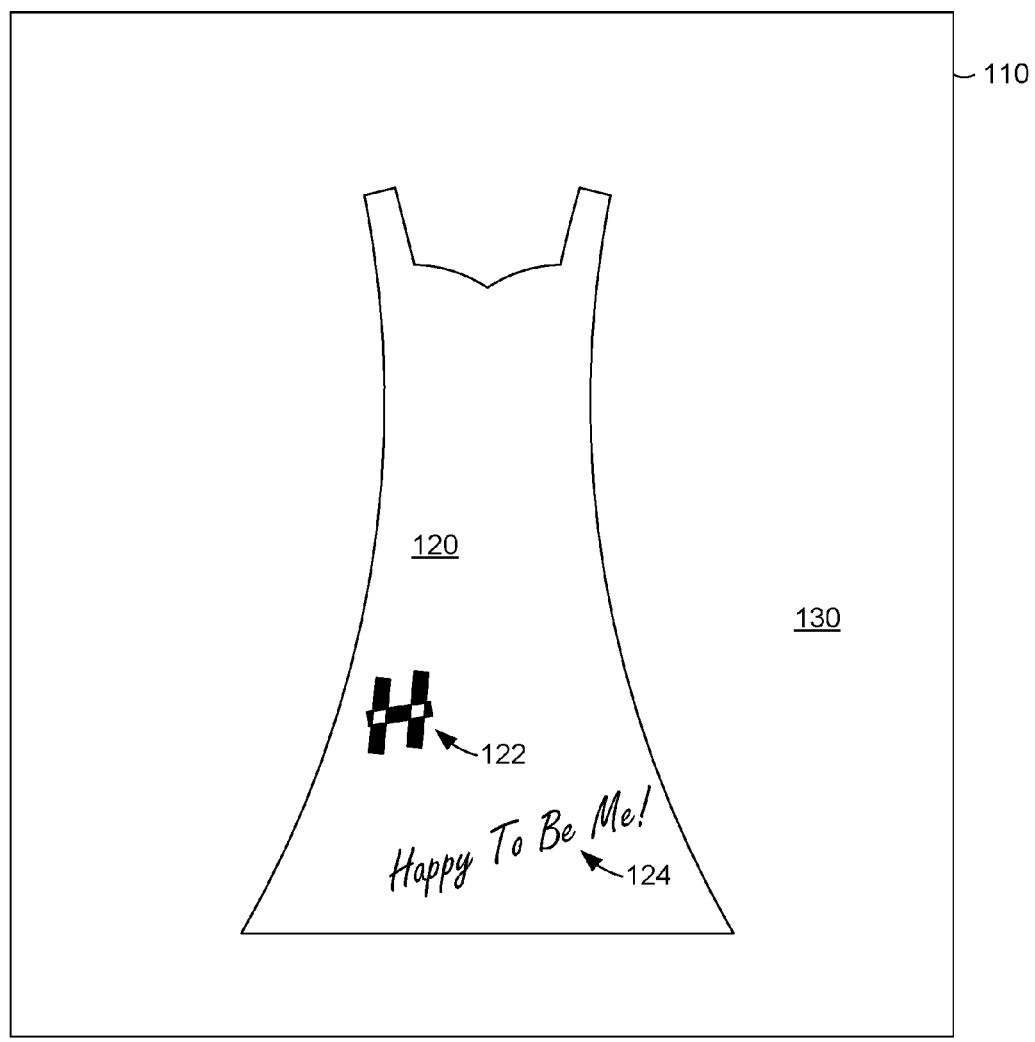
FIG. 1 is a diagram illustrating an image of an item, according to some example embodiments.

Example methods and systems are directed to identifying product metadata from an item image. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An item available for purchase may have a characteristic that can be described by an attribute. For example, a woman's dress may have a particular shape as a characteristic, and the characteristic shape may be described by the attribute "style." As another example, a car may have a particular color that is described by the attribute "exterior color." In addition to style and color, examples of attributes include size (e.g., shoe size, or dress size) and category (e.g., car classification or type).

An attribute of an item may have a value, and the value may be specified by a descriptor as one value out of multiple possible values that are valid for that attribute. For example, a woman's dress may have a shape conforming to a "style" known as "evening gown," where the descriptor "evening gown" specifies one value of the attribute "style" out of several possible values that are valid for the attribute "style" (e.g., "cocktail dress" or "sundress"). As another example, a car may have an "exterior color" that is named "red," where the descriptor "red" specifies one value of the attribute "exterior color" out of many possible values that are valid for the attribute "exterior color" (e.g., "green," "white," "blue," or "silver").

Accordingly, as used herein, a "characteristic" of an item is a perceivable feature of the item describable by an attribute and a value. An "attribute" of an item is a word, phrase, number, code or other information that describes a characteristic of the item, and a "descriptor" is a word, phrase, number, code or other information that specifies a value for an attribute. As such, a characteristic of an item may be represented by an attribute-value pair (e.g., "style: evening gown," or "exterior color=red).

A system in the example form of a metadata extraction machine is configured to access an image that depicts an item and identify an attribute of the item and a descriptor that specifies a value for the identified attribute. The system identifies the attribute and the descriptor based on an analysis of the accessed image. This analysis includes distinguishing a foreground portion of the image from a background portion of the image. The foreground portion of the image depicts the item, while the background portion of the image does not depict any part of the item. In other words, the item is absent from the background portion of the image. Distinguishing a foreground portion from the background portion may include segmenting the image to identify the foreground and background portions. Some or all of this analysis may be performed by the system.

The system then stores the identified descriptor of the item as metadata of the item. For example, the system may store the attribute as corresponding to the descriptor (e.g., as an attribute-value pair). In storing the descriptor of the item, the system may add the descriptor to the metadata of the item. Alternatively, the system may use the descriptor to replace another descriptor in the metadata of the item. Since the item is a specimen of a product, the system may store the identified descriptor as metadata of the product.

The analysis of the image may further include identifying a shape of the item or product, a color of the item or product, a pattern on the item or product, text on the item or product, or any suitable combination thereof, within the image of the item. The system may identify the attribute, the descriptor, or both, based on the identified shape, color, pattern, or text.

In some situations, the image may include prohibited information. As used herein, "prohibited information" refers to information that is disallowed (e.g., according to one or more rules or policies) within an image submitted to a network-based system (e.g., a network-based commerce system). The prohibited information may include text, a shape (e.g., a graphic), or both. Examples of text that may be prohibited include a uniform resource locator (URL), a profane or vulgar word, a particular message (e.g., a copyrighted statement or phrase), and a particular brand name (e.g., a manufacturer, importer, or retailer). Examples of shapes that may be prohibited include a design (e.g., a copyrighted design), a logo, a trademark, and a symbol (e.g., an offensive or obscene symbol).

The analysis of the image may include identifying the prohibited information within the image of the item. Accordingly, the descriptor identified by the system may indicate that the image includes prohibited information (e.g., indicates that prohibited information is present in the image). Based on the identification of the prohibited information, the system may initiate a response to the prohibited information. Examples of responses include notifying a seller of the item, requesting another (e.g., policy compliant) image of the item, removing the image, removing a listing of the item, restricting the seller (e.g., preventing the seller from using a portion of the network-based system).

In various example embodiments, the system may receive the image from a device that corresponds to the seller of the item. Having identified the descriptor, the system may communicate a message to the device of the seller. The message may include a question regarding whether to associate the descriptor with the item, a suggestion that the descriptor be associated with the item, a recommendation that the descriptor be associated with the item, a notification that the descriptor is associated with the item, or any suitable combination thereof.

In some example embodiments, the system may receive user input that is related to the identified descriptor from a device of a user (e.g., of the metadata extraction machine or of the network-based system). For example, the user input may include the identified descriptor, the identified attribute, another descriptor that specifies a different value valid for the identified attribute, or any suitable combination thereof. In response to reception of user input, the system may provide a recommendation of the item to the device of the user based on the identified descriptor.

FIG. 1 is a diagram illustrating an image 110 of an item, according to some example embodiments. The item is a specimen of a product (e.g., a dress). The image 110 represents the item by depicting it in the foreground portion 120 of the image 110. The item is absent from the background portion 130 of the image 110.

The image further depicts a design 122 (e.g., a stylized "H"), as well as text 124 (e.g., "Happy To Be Me!"). As shown, the design 122 and the text 124 appear within the image 110 on the foreground portion 120 of the item shown in the image 110.

Figure 2:
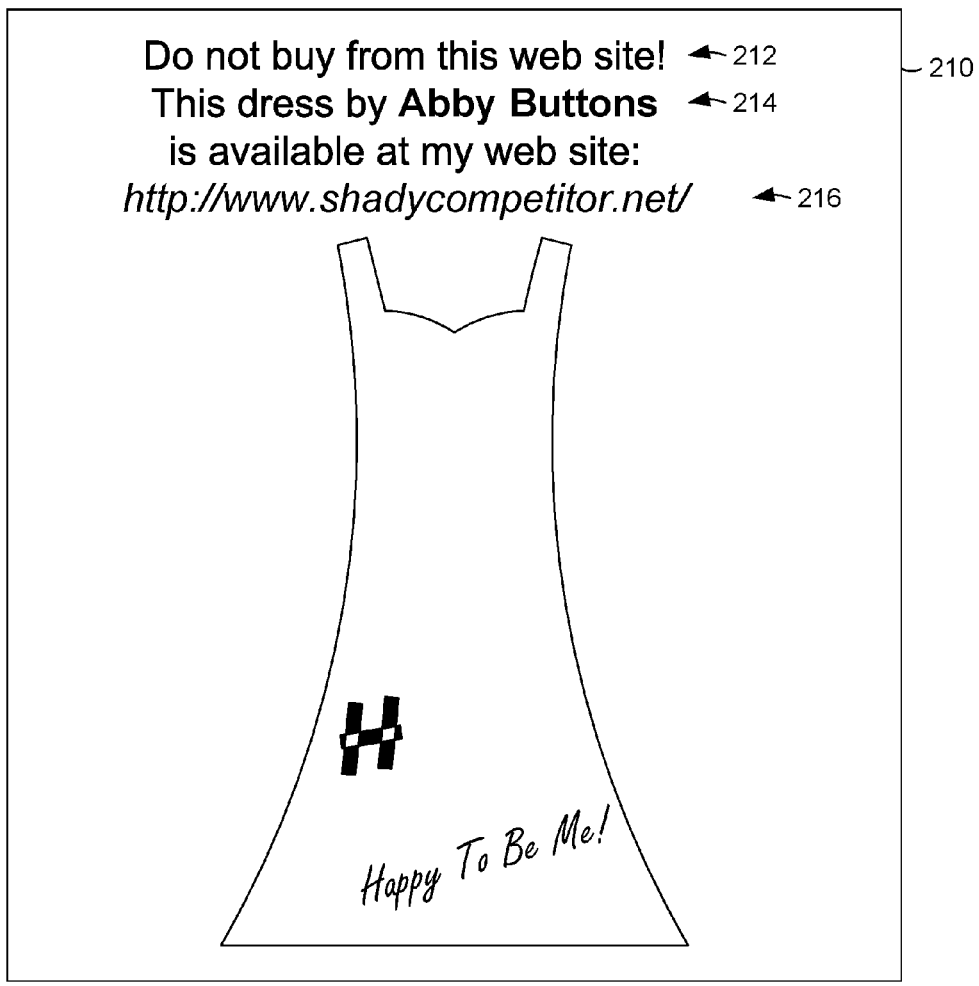
FIG. 2 is a diagram illustrating another image of an item, according some example embodiments.

FIG. 2 is a diagram illustrating another image 210 of an item, according some example embodiments. The appearance of the image 210 is similar to the appearance of the image 110 described above. However, the image 210 additionally includes prohibited text 212, 214, and 216. As shown, the prohibited text 212 is a message (e.g., "Do not buy from this website!"). The text 214 is a message that includes a manufacturer (e.g., "Abby Buttons") of the item depicted in the image 210. The text 216 is a URL (e.g., "http://www.shadycompetitor.net/").

In some situations, the prohibited text 212, 214, and 216 may be included in the image 210 by an unscrupulous seller, for example, in an attempt to dissuade a user of a network-based commerce system (e.g., an online shopping website) from purchasing the item via the network-based commerce system. Accordingly, the network-based commerce system may implement a policy or rule that forbids use of the prohibited text 212, 214, and 216 within the network-based commerce system.

Figure 3:
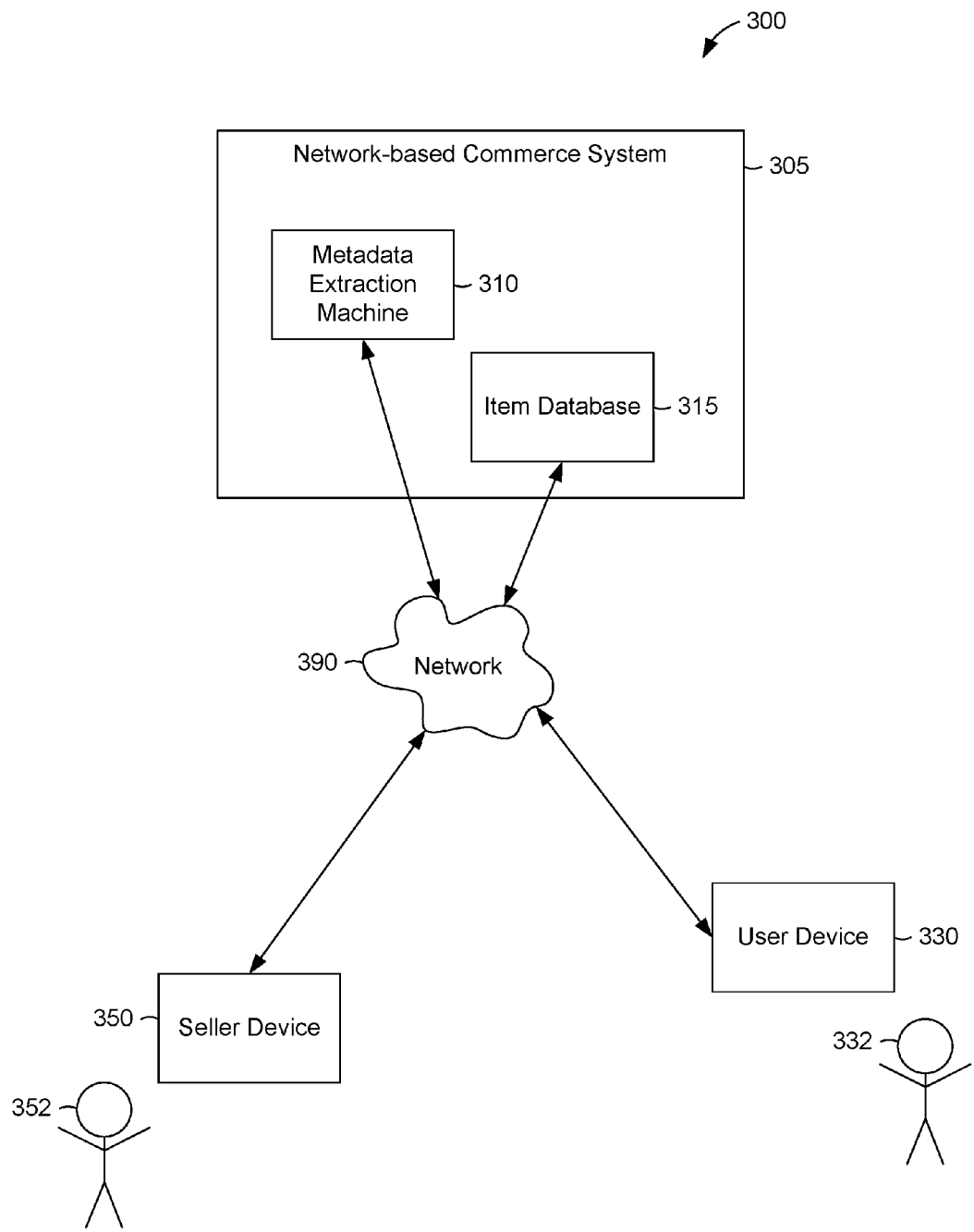
FIG. 3 is a network diagram illustrating a network environment with a metadata extraction machine suitable for identifying product metadata from an item image, according to some example embodiments.

FIG. 3 is a network diagram illustrating a network environment 300 with a metadata extraction machine 310 that is suitable for identifying product metadata from an item image (e.g., image 110 or image 210), according to some example embodiments. The network environment 300 includes the metadata extraction machine 310, an item database 315, a user device 330, and a seller device 350, all communicatively coupled to each other via a network 390. As shown, the metadata extraction machine 310 and the item database 315 are included (e.g., as components) within a network-based commerce system 305.

The metadata extraction machine 310 may be a server (e.g., a web server). The item database 315 may be a data repository (e.g., a file server) that stores information pertinent to the metadata extraction machine 310, the network-based commerce system 305, or any suitable combination thereof.

Also shown in FIG. 3 are a user 332 and a seller 352. The user 332 is a user of the user device 330, and the seller 352 corresponds to the seller device 350. The seller 352 may be a seller of the item that is available for purchase, and the user 332 may be a potential purchaser (e.g., a potential buyer) of the item. The user 332, the seller 352, or both, may be a human user (e.g., a human being), a machine user (e.g., software program to interact with a client device), or any suitable combination thereof. The user 332 is not part of the network environment 300, but is associated with the user device 330. The user device 330 may be a deskside computer belonging to the user 332. Similarly, the seller 352 is not part of the network environment 300, but is associated with the seller device 350. As an example, the seller device 350 may be a tablet computer belonging to the seller 352.

Any of the machines, databases, or devices shown in FIG. 3 may be implemented in a general-purpose computer modified (e.g., configured or programmed) by software to be a special-purpose computer to perform the functions described herein for that machine. For example, a computer system able to implement any one or more of the modules or methodologies described herein is discussed below with respect to FIG. 9. As used herein, a "database" is a data storage resource and may store data structured as a text file, a table, a spreadsheet, a relational database, a triple store, or any suitable combination thereof. Moreover, any two or more of the machines illustrated in FIG. 3 may be combined into a single machine, and the functions described herein for any single machine may be subdivided among multiple machines.

The network 390 may be any network that enables communication between machines (e.g., the metadata extraction machine 310 and the seller device 350). Accordingly, the network 390 may be a wired network, a wireless network, or any suitable combination thereof. The network 390 may include one or more portions that constitute a private network, a public network (e.g., the Internet), or any suitable combination thereof.

Figure 4:
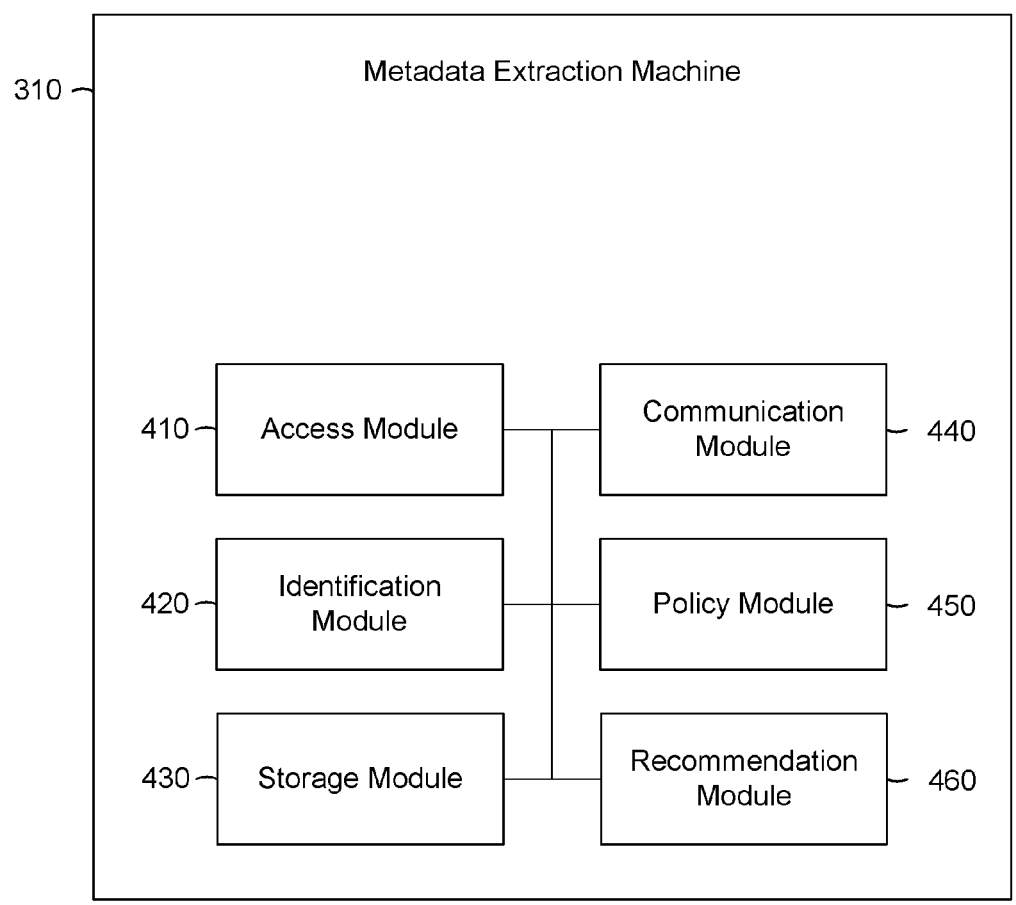
FIG. 4 is a block diagram of a metadata extraction machine, according to some example embodiments.

FIG. 4 is a block diagram of the metadata extraction machine 310, according to some example embodiments. The metadata extraction machine 310 includes an access module 410, an identification module 420, a storage module 430, a communication module 440, a policy module 450, and a recommendation module 460, all configured to communicate with each other (e.g., via a bus, a shared memory, or a switch). Any one or more of these modules may be implemented using hardware (e.g., a processor of a machine) or a combination of hardware and software. Moreover, any two or more of these modules may be combined into a single module, and the functions described herein for a single module may be subdivided among multiple modules.

The access module 410 is configured to access an image (e.g., image 110 or image 210) that depicts an item. As noted above, the item may be a specimen of a product available for purchase (e.g., from the seller 352). The item may have an attribute that describes a characteristic of the item, and the item may have a descriptor that specifies a value of the attribute.

The identification module 420 is configured to identify the attribute of the item and the descriptor of the item. The identification module 420 may identify the attribute and the descriptor based on analysis of the image. As noted above, this analysis may include distinguishing the foreground portion (e.g., foreground portion 120) of the image from a background portion (e.g., background portion 130) of the image, where the foreground portion depicts the item and the item is absent from the background portion. In various example embodiments, the identification module 420 is configured to perform the analysis of the image.

The storage module 430 is configured to store the identified descriptor of the item as metadata of the item. For example, the storage module 430 may store the identified descriptor in the item database 315, as metadata of the item. Storage of the identified descriptor may include adding the identified descriptor as new metadata of the item. Alternatively, storage of the identified descriptor may include replacing an existing descriptor with the identified descriptor within an existing metadata of the item.

The communication module 440 is configured to receive the image. For example, the communication module 440 may receive the image from the seller device 350 (e.g., upon submission of the image by the seller 352). In some example embodiments, the communication module 440 may provide the seller device 350 with software (e.g., an application, applet, or app) that configures the seller device 350 to communicate with the communication module 440 (e.g., send the image). According to certain example embodiments, the communication module 440 may provide the user device 330 with software (e.g., an application, applet, or app) that configures the user device 330 communicate with the communication module 440 (e.g., send user input). The communication module 440 is further configured to communicate one or more messages to the seller device 350. As noted above, the message may include a question regarding whether to associate the descriptor with the item, a suggestion that the descriptor be associated with the item, a recommendation that the descriptor be associated with the item, a notification that the descriptor is associated with the item, or any suitable combination thereof.

The policy module 450 is configured to implement (e.g., enforce) one or more rules or policies of the network-based commerce system 305. In some example embodiments, the identification module 420 is configured to identify prohibited information within the image. The policy module 450 is further configured to initiate a response to the prohibited information (e.g., in response to the identification of the prohibited information). As noted above, examples of such a response include notifying a seller of the item, requesting another (e.g., policy compliant) image of the item, removing the image, removing a listing of the item, and restricting the seller (e.g., preventing or de-authorizing the seller from using a portion of the network-based system).

The recommendation module 460 is configured to provide one or more recommendations of items. For example, the recommendation module 460 may provide a recommendation of the item depicted in the image accessed by the access module 410. As another example, the recommendation module 460 may provide a recommendation of another item (e.g., one that is pertinent to the item depicted in the image). A recommendation may be provided by the recommendation module 460 based on the identified descriptor, the identified attribute, or both. In some example embodiments, the communication module 440 is configured to receive user input that is related to the descriptor identified from the image by the identification module 420. The user input may be received from the user device 330 (e.g., as a submission by the user 332), and the user input may include the identified attribute, the identified descriptor, another descriptor that is valid for the identified attribute, or any suitable combination thereof. The recommendation module 460 may be configured to provide one or more recommendations of items to the user device 330, in response to the received user input and based on the received user input.

Figure 5:
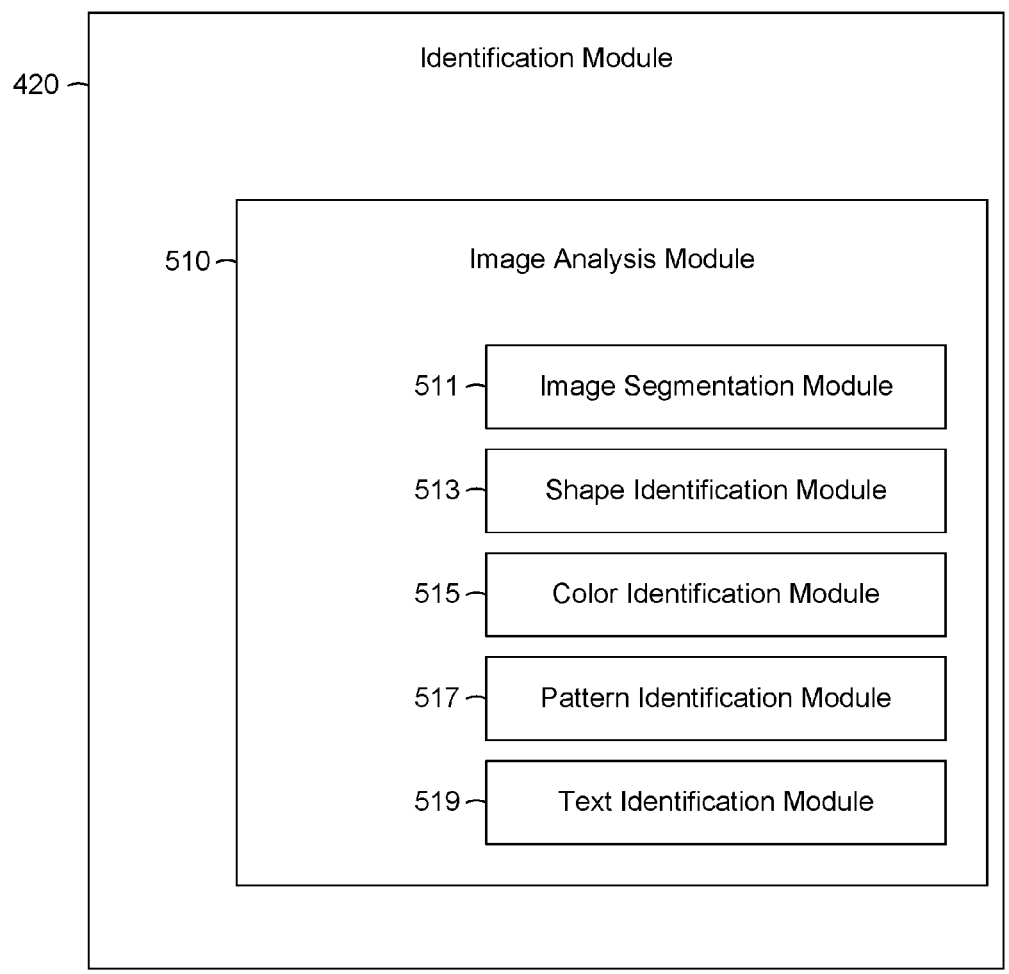
FIG. 5 is a block diagram of an identification module within a metadata extraction machine, according to some example embodiments.

FIG. 5 is a block diagram of the identification module 420 within the metadata extraction machine 310, according to some example embodiments. The identification module 420 includes an image analysis module 510. The image analysis module 510 is configured to perform the analysis of the image that depicts the item. Accordingly, the image analysis module 510 may enable the identification module 420 to perform the analysis of the image.

The image analysis module 510 includes an image segmentation module 511, a shape identification module 513, a color identification module 515, a pattern identification module 517, and a text identification module 519, all configured to communicate with each other (e.g., via a bus, a shared memory, or a switch). Any one or more of these modules may be implemented using hardware (e.g., a processor of a machine) or a combination of hardware and software. Moreover, any two or more of these modules may be combined into a single module, and the functions described herein for a single module may be subdivided among multiple modules.

The image segmentation module 511 is configured to segment an image (e.g., image 110 or image 210) into a foreground portion (e.g., foreground portion 120) of the image and a background portion (e.g., background portion 130) of the image. For example, the image segmentation module 511 may perform graph cuts segmentation (e.g., using one or more graph cut techniques) to segment the image. This may have the effect of identifying the foreground portion and the background portion within the image. Hence, the image segmentation module 511 may enable the image analysis module 510 to distinguish the foreground portion from the background portion of the image. Accordingly, the identification module 420 may identify the attribute, the descriptor, or both, based on the segmented image.

In some example embodiments, the item depicted in the image is a specimen of a product that has a particular shape represented within the image. The shape identification module 513 is configured to identify a shape (e.g., design 122) within an image (e.g., image 110 or image 210). For example, the shape identification module 513 may identify a shape of the product, of a portion of the product, of the item, of a portion of the item, or any suitable combination thereof. Accordingly, the identification module 420 may identify the attribute, the descriptor, or both, based on the identified shape. The identification of the shape may be based on a comparison of the shape to one or more reference shapes stored in a database (e.g., item database 315).

In certain example embodiments, the item depicted in the image is a specimen of a product that has a particular color represented within the image. The color identification module 515 is configured to identify a color (e.g., red) within the image. For example, the color identification module 515 may identify a color of the product, of a portion of the product, of the item, of a portion of the item, or any suitable combination thereof. Accordingly, the identification module 420 may identify the attribute, the descriptor, or both, based on the identified color.

In various example embodiments, the item depicted in the image as a specimen of a product that has a particular pattern represented within the image. The pattern identification module 517 is configured to identify a pattern (e.g., stripes or plaid) within the image. For example, the pattern identification module 517 may identify a pattern on (e.g., applied to) the product, on a portion of the product, on the item, on a portion of the item, or any suitable combination thereof. Accordingly, the identification module 420 may identify the attribute, the descriptor, or both, based on the identified pattern. The identification of the pattern may be based on a comparison of the pattern to one or more reference patterns stored in a database (e.g., item database 315).

In some example embodiments, the item depicted in the image is a specimen of a product that has text represented within the image. The text identification module 519 is configured to identify text (e.g., a letter, a number, a word, a phrase, or punctuation) within the image. For example, a text identification module 519 may identify text on (e.g., applied to) the product, on a portion of the product, on the item, on a portion of the item, or any suitable combination thereof. Accordingly, the identification module 420 may identify the attribute, the descriptor, or both, based on the identified text. The identification of the text may be based on a comparison of the text to one or more reference strings of text stored in a database (e.g., item database 315).

In certain example embodiments, the image includes prohibited information in the form of prohibited text (e.g., prohibited text 212, 214, or 216). The text identification module 519 is configured to identify prohibited text within the image. For example, the text identification module 519 may identify prohibited text on the product, on a portion of the product, on the item, on a portion of the item, in the foreground portion (e.g., foreground portion 120) of the image, in the background portion (e.g., background portion 130) of the image, or any suitable combination thereof. Accordingly, the identification module 420 may identify an attribute that indicates whether prohibited text is present in the image. Furthermore, the identification module 420 may identify a descriptor that indicates that the image includes prohibited text (e.g., a flag value indicating that prohibited text is present within the image). The identification of the prohibited text may be based on a comparison of the prohibited text to one or more reference strings of text stored in a database (e.g., item database 315).

In various example embodiments, the image includes prohibited information in the form of a prohibited shape (e.g., design 122). The shape identification module 513 is configured to identify one or more prohibited shapes within the image. For example, the shape identification module 513 may identify a prohibited shape on the product, on a portion of the product, on the item, on a portion of the item, in the foreground portion (e.g., foreground portion 120) of the image, in the background portion (e.g., background portion 130 of the image, or any suitable combination thereof. Accordingly, the identification module 420 may identify an attribute that indicates whether a prohibited shape is present in the image. Furthermore, the identification module 420 may identify a descriptor that indicates that the image includes a prohibited shape (e.g., a flag value indicating that a prohibited shape is present within the image). The identification of the prohibited shape may be based on a comparison of the prohibited shape to one or more reference shapes stored in a database (e.g., item database 315) as prohibited shapes.

Figure 6:
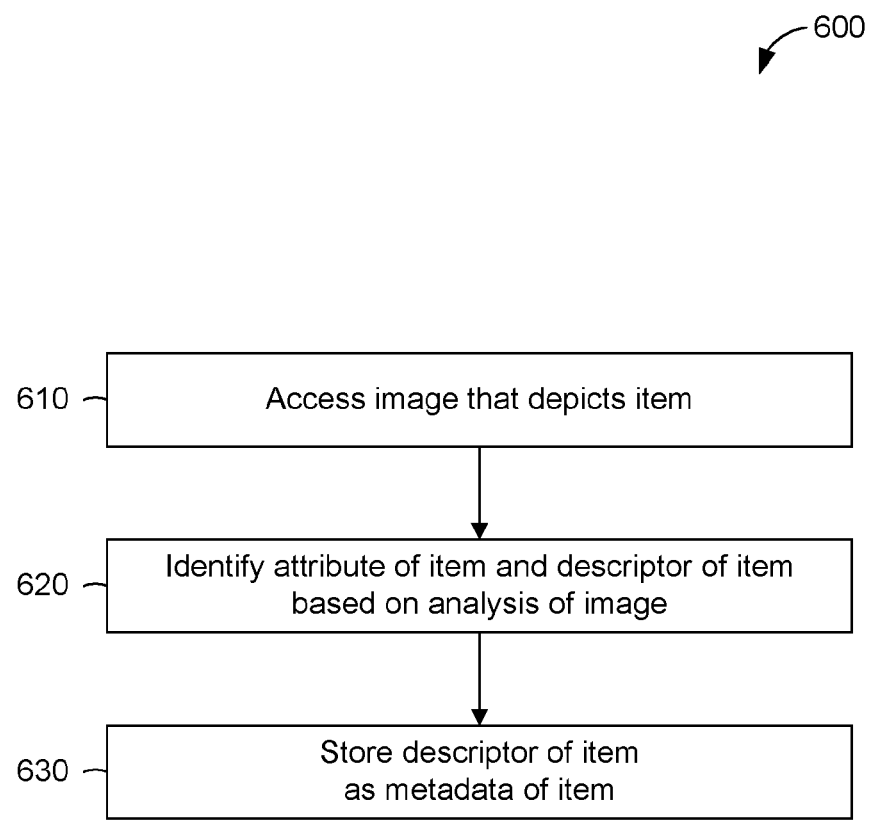
FIG. 6-8 are flowcharts illustrating operations in a method of identifying product metadata from an item image, according to some example embodiments.
Figure 7:
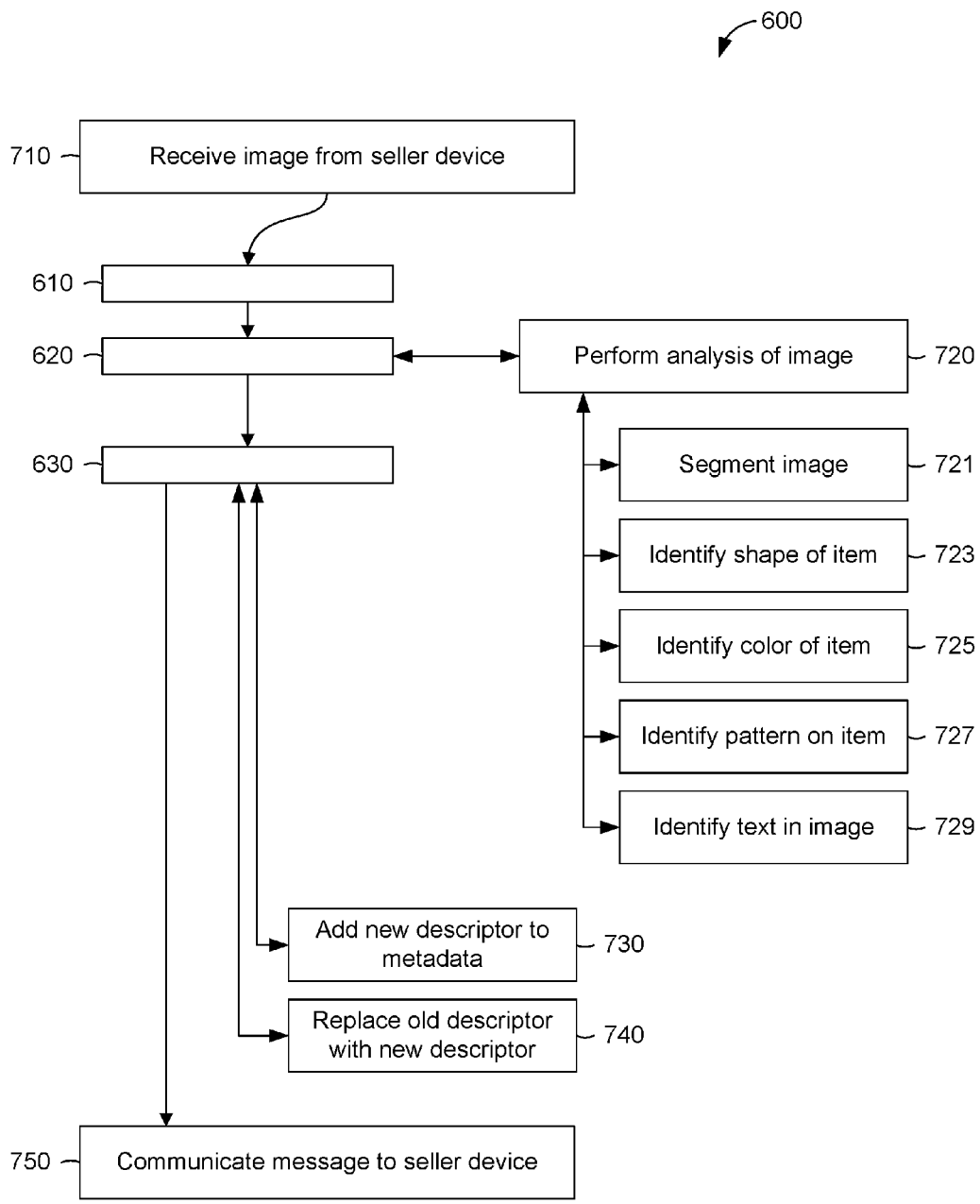
Figure 8:
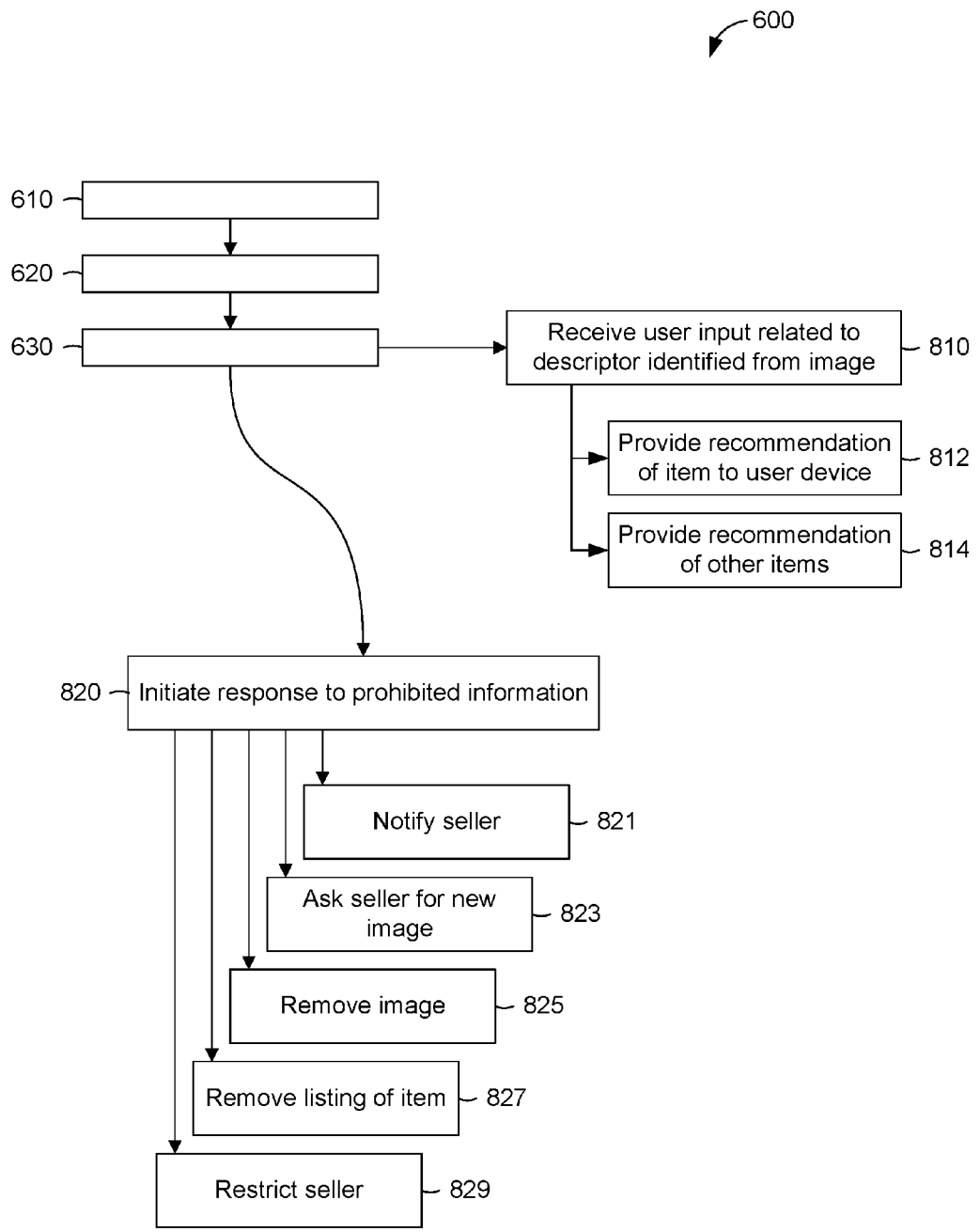

FIG. 6-8 are flowcharts illustrating operations in a method 600 of identifying product metadata from an image (e.g., image 110 or image 210), according to some example embodiments. Operations in the method 600 may be performed by the metadata extraction machine 310, using one or more modules described above with respect to FIG. 4-5.

As shown in FIG. 6, some example embodiments of the method 600 include operations 610, 620, and 630. In operation 610, the access module 410 of the metadata extraction machine 310 accesses an image (e.g., image 110 or image 210) that depicts an item.

In operation 620, the identification module 420 of the metadata extraction machine 310 identifies an attribute of the item and a descriptor of the item based on an analysis of the image. The analysis may include distinguishing a foreground portion (e.g., foreground portion 120) of the image from a background portion (e.g., background portion 130) of the image.

In operation 630, the storage module 430 of the metadata extraction machine 310 stores at least the identified descriptor of the item as metadata of the item (e.g., in the item database 315). Storage of the identified descriptor may include storing the identified attribute. For example, the storage module 430 may store the identified descriptor as corresponding to the identified attribute (e.g., as an attribute-value pair).

As shown in FIG. 7, the method 600 may include operations 710, 720, 721, 723, 725, 727, 729, 730, 740, and 750.

Operations 710-750 may be performed by the metadata extraction machine 310, using one or more modules described above with respect to FIG. 4-5.

In operation 710, the communication module 440 of the metadata extraction machine 310 receives the image (e.g., image 110 or image 210) from the seller device 350. For example, the communication module 440 may receive the image as a submission from the seller 352 via the seller device 350 and the network 390. Operation 610 may be performed by the access module 410 in response to reception of the image in operation 710.

In operation 720, the image analysis module 510 within the identification module 420 of the metadata extraction machine 310 performs the analysis of the image discussed above with respect to operation 620. Accordingly, the analysis of the image may be performed by the image analysis module 510 as part of operation 620, as executed by the identification module 420. One or more of operations 721-729 may be included in the analysis performed by the image analysis module 510.

In operation 721, the image segmentation module 511 within the image analysis module 510 processes (e.g., segments) the image to identify a foreground portion (e.g., foreground portion 120) of the image and a background portion (e.g., background portion 130) of the image. Accordingly, the distinguishing of the foreground portion from the background portion discussed above with respect to operation 620 may be based on the identification of the foreground portion and the background portion performed in operation 721.

In operation 723, the shape identification module 513 within the image analysis module 510 identifies (e.g., recognizes) a shape represented within the image. As noted above, the shape may be of a portion or entirety of a product or item depicted in the image. Accordingly, the identification of the attribute of the item, the descriptor of the item, or both, discussed above with respect to operation 620 may be performed by the identification module 420 based on the shape identified in operation 723. In some example embodiments, the shape identification module 513 recognizes a prohibited shape (e.g., design 122) within the image as being prohibited information within the image.

In operation 725, the color identification module 515 within the image analysis module 510 identifies (e.g., recognizes) a color represented within the image. As noted above, the color may be of a portion or entirety of a product or item depicted in the image. Accordingly, the identification of the attribute of the item, the descriptor of the item, or both, discussed above with respect to operation 620 may be performed by the identification module 420 based on the color identified in operation 725.

In operation 727, the pattern identification module 517 within the image analysis module 510 identifies (e.g., recognizes) a pattern represented within the image. As noted above, the pattern may be on a portion or entirety of a product or item depicted in the image. Accordingly, the identification of the attribute of the item, the descriptor of the item, or both, discussed above with respect to operation 620 may be performed by the identification module 420 based on the pattern identified in operation 727.

In operation 729, the text identification module 519 within the image analysis module 510 identifies (e.g., recognizes) text represented within the image. As noted above, the text may be on a portion or entirety of a product or item depicted in the image. Accordingly, the identification of the attribute of the item, the descriptor of the item, or both, discussed above with respect to operation 620 may be performed by the identification module 420 based on the text identified in operation 729. In some example embodiments, the text identification module 519 recognizes prohibited text (e.g., prohibited text 212, 214, or 216) within the image as being prohibited information within the image.

According to some example embodiments, operation 730 is included within operation 630. In operation 730, the storage module 430 of the metadata extraction machine 310 adds the descriptor identified in operation 620 to existing metadata of the item (e.g., stored within the item database 315). For example, the identified descriptor may be added by appending the identified descriptor to the existing metadata of the item.

According to alternative example embodiments, operation 740 is included within operation 630. In operation 740, the storage module 430 of the metadata extraction machine 310 replaces an existing descriptor with the descriptor identified in operation 620 within existing metadata of the item (e.g., stored within the item database 315). For example, the existing descriptor may be overwritten with the identified descriptor in the metadata of the item.

In operation 750, the communication module 440 communicates a message to the seller device 350 (e.g., via the network 390). As noted above, the message may include a question regarding whether to associate the descriptor with the item, a suggestion that the descriptor be associated with the item, a recommendation that the descriptor be associated with the item, a notification that the descriptor is associated with the item, or any suitable combination thereof.

As shown in FIG. 8, the method 600 may include operations 810, 812, 814, 820, 821, 823, 825, 827, and 829. Operations 810-829 may be performed by the metadata extraction machine 310, using one or more modules described above with respect to FIG. 4-5.

In operation 810, the communication module 440 of the metadata extraction machine 310 receives a user input from the user device 330. For example, the communication module 440 may receive the user input as a submission from the user 332 via the user device 330 and the network 390. The user input is related to the descriptor identified in operation 620, to the attribute identified in operation 620, or to both. For example, the user input may include the identified descriptor (e.g., "evening gown" or "red"), the identified attribute (e.g., "style" or "color"), another descriptor that specifies a different value that is valid for the identified attribute (e.g., "cocktail dress" or "green"), or any suitable combination thereof.

In some example embodiments, operation 810 is followed by operation 812, operation 814, or both. In operation 812, the recommendation module 460 of the metadata extraction machine 310 provides a recommendation of the item to the user device 330. The providing of the recommendation may be based on the descriptor identified in operation 620, the attribute identified in operation 620, or both. In operation 814, the recommendation module 446 provides a recommendation of another item (e.g., a further item different from the item depicted in the image) to the user device 330. Again the providing of the recommendation may be based on the identified descriptor, the identified attribute, or both. Accordingly, metadata (e.g., the identified descriptor) extracted from the image may be utilized in recommending one or more items or products to the user 332. Operation 814 may be repeated to provide multiple recommendations of other items (e.g., further items different from the item depicted in the image) to the user device 330.

According to various example embodiments, operation 620 results in the identification module 420 of the metadata extraction machine 310 identifying the prohibited information within the image (e.g., prohibited text 212, 214, or 216 within image 210). For example, prohibited information may be identified by the shape identification module 513 in operation 723, by the text identification module 519 in operation 729, or any suitable combination thereof. In response to the identified prohibited information, the metadata extraction machine 310 may perform operation 820, which involves initiating one or more responses to the prohibited information. Example responses are shown in FIG. 8 as operations 821-829.

In operation 821, the communication module 440 of the metadata extraction machine 310 notifies the seller 352 that the image includes prohibited information. For example, the communication module 440 may send an electronic message addressed to the seller 352. As another example, the communication module 440 may provide a pop-up alert within a web page displayed by the seller device 350).

In operation 823, the communication module 440 of the metadata extraction machine 310 requests that the seller 352 provide another image (e.g., a policy compliant image) that depicts the item without the prohibited information. As examples, such request may be communicated by an electronic message address to the seller 352, by a pop-up alert within a web page displayed by the seller device 350, or any suitable combination thereof.

In operation 825, the storage module 430 of the metadata extraction machine 310 removes the image from the network-based commerce system 305. For example, the storage module 430 may delete the image from a data repository where the image is stored (e.g., item database 315).

In operation 827, the policy module 450 of the metadata extraction machine 310 may remove a listing of the item from the network-based commerce system 305. For example, the item database 315 may store the listing of the item among multiple listings of multiple items available for purchase, and in performing operation 827, the policy module 450 may delete the listing of the item from the item database 315.

In operation 829, the policy module 450 of the metadata extraction machine 310 may restrict (e.g., prevent) the seller 352 from using some or all of the network-based commerce system 305. For example, the policy module 450 may suspend or terminate a user account of the seller 352. As another example, the policy module 450 may de-authorize the seller 352 from using certain portions of the network-based commerce system 305 (e.g., a user interface for uploading images when listing an item available for purchase).

According to various example embodiments, one or more of the methodologies described herein may facilitate extraction of metadata regarding an item or product from an image of the item or product. In particular, one or more of the methodologies described herein may constitute all or part of a business method (e.g., a business method implemented using a machine) that provides users of a network-based system with information (e.g., metadata and recommendations) useful in making decisions regarding purchasing an item. Accordingly, one or more of the methodologies described herein may have the effect of increasing sales of a product or item, educating a user on the product or item, or any suitable combination thereof.

When these effects are considered in aggregate, one or more of the methodologies described herein may obviate a need for certain efforts or resources that otherwise would be involved in matching users (e.g., as potential purchasers) with products or specimens thereof that are likely to be of interest. Efforts expended by a user in identifying a product or item for purchase may be reduced by one or more of the methodologies described herein. Computing resources used by one or more machines, databases, or devices (e.g., within the network environment 300) may similarly be reduced. Examples of such computing resources include processor cycles, network traffic, memory usage, data storage capacity, power consumption, and cooling capacity.

Figure 9:
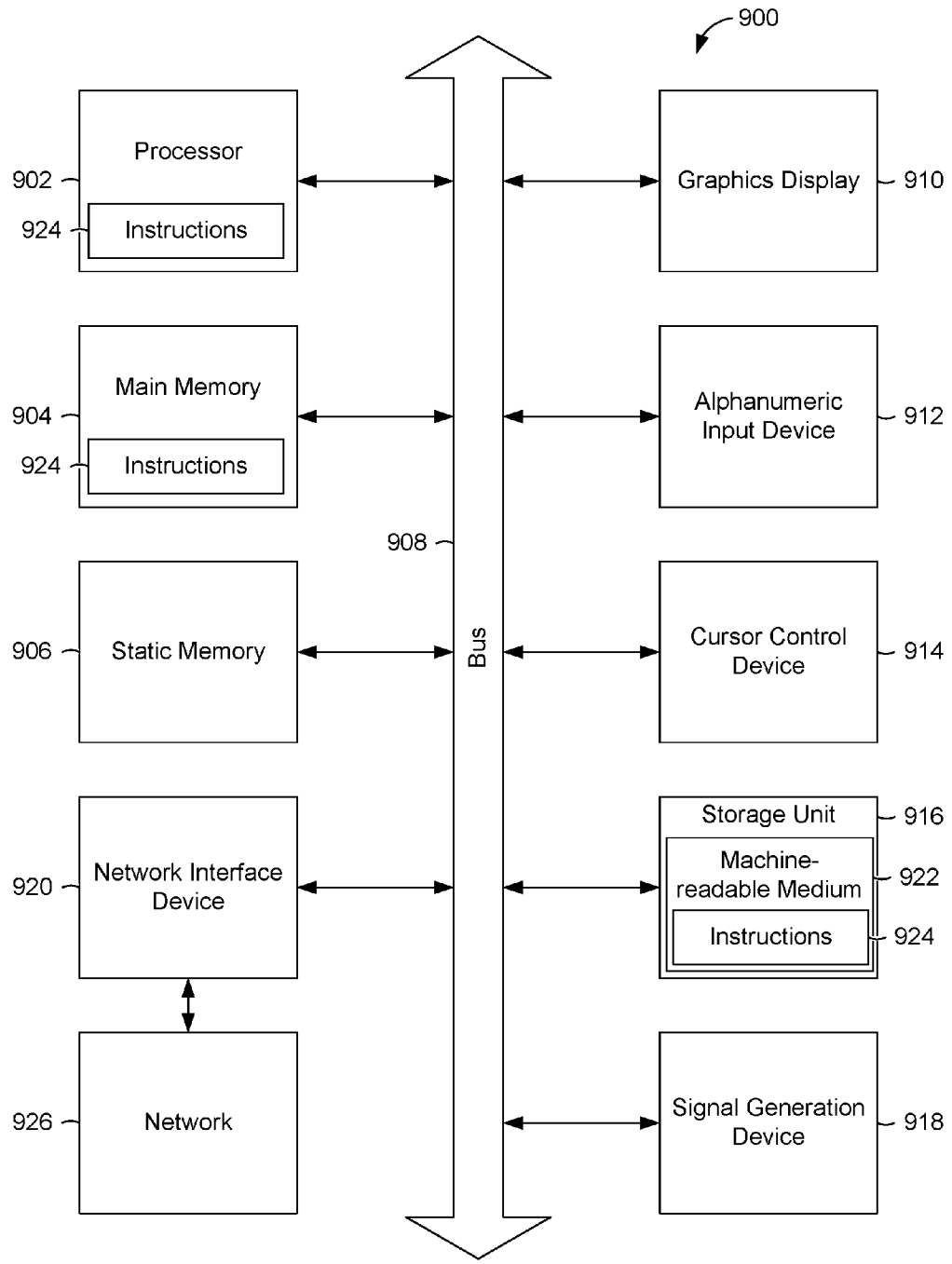
FIG. 9 is a block diagram illustrating components of a machine, according to some example embodiments, able to read instructions from a machine-readable medium and perform any one or more of the methodologies discussed herein.

FIG. 9 illustrates components of a machine 900, according to some example embodiments, that is able to read instructions from a machine-readable medium (e.g., a machine-readable storage medium) and perform any one or more of the methodologies discussed herein. Specifically, FIG. 9 shows a diagrammatic representation of the machine 900 in the example form of a computer system and within which instructions 924 (e.g., software) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924 (sequentially or otherwise) that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 (e.g., network 390) via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., software) for execution by the machine, such that the instructions, when executed by one or more processors of the machine (e.g., processor 902), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
   one or more hardware processors; and
   a non-transitory machine-readable medium for storing instructions that, when executed by the one or more hardware processors, cause the one or more hardware processors to perform operations comprising:
   accessing an image that depicts an item, the item depicted in the image having an attribute that describes a characteristic of the item and an attribute descriptor that corresponds to the attribute of the item and specifies a value of the attribute;
   performing an analysis of the image based on image segmentation of the image, the analysis including:
   identifying text on the item within the image, and
   identifying the attribute descriptor corresponding to the attribute based on the identified text on the item; and
   transmitting a communication to a device of a user based on the identifying of the attribute descriptor corresponding to the attribute of the item depicted in the image.

2. The system of claim 1, wherein the image segmentation of the image includes graph cut segmentation of the image.

3. The system of claim 1, wherein the image segmentation of the image includes segmenting the image based on a graph cutting technique to identify a foreground portion of the image and a background portion of the image.

4. The system of claim 3, wherein the image segmentation of the image further includes identifying a depiction of the item in the foreground portion of the image.

5. The system of claim 1, wherein the item is a specimen of a product available for purchase.

6. The system of claim 5, wherein:
   the product has a shape represented within the image;
   the analysis of the image includes identifying the shape of the product within the image; and
   the identifying of the attribute descriptor is based on the identified shape of the product.

7. The system of claim 6, wherein the identifying of the shape of the product within the image includes identifying the shape of the product within a foreground portion of the image.

8. The system of claim 5, wherein:
   the product has a color represented within the image;
   the analysis of the image includes identifying the color of the product within the image; and
   the identifying of the attribute descriptor is based on the identified color of the product.

9. The system of claim 8, wherein the identifying of the color of the product within the image includes identifying the color of the product within a foreground portion of the image.

10. The system of claim 5, wherein:
    the product has a pattern represented within the image;
    the analysis of the image includes identifying the pattern on the product within the image; and
    the identifying of the attribute descriptor is based on the identified pattern on the product.

11. The system of claim 10, wherein the identifying of the pattern on the product within the image includes identifying the pattern of the product within a foreground portion of the image.

12. The system of claim 5, wherein the product has text represented within the image.

13. The system of claim 12, wherein the identifying of the text on the item within the image includes identifying the text on the product within a foreground portion of the image.

14. The system of claim 1, wherein the user is a seller of the item, and the device of the user is a device of the seller, the system further comprising:
    providing software to the device of the seller of the item; and
    receiving the image from the device of the seller of the item, the device being configured by the provided software to communicate the image.

15. The system of claim 14, further comprising:
    communicating a message to the device of the seller, the message including at least one of a question on whether to associate the identified attribute descriptor with the item, a suggestion that the identified attribute descriptor be associated with the item, a recommendation that the identified attribute descriptor be associated with the item, or a notification that that the identified attribute descriptor is associated with the item.

16. The system of claim 1, further comprising:
    providing software to a device of a user; and
    receiving a user input related to the attribute descriptor from the device of the user, the device being configured by the provided software to communicate the user input.

17. The system of claim 16, wherein the user input includes at least one of the attribute descriptor, the attribute corresponding to the descriptor, or a further descriptor that specifies a further value valid for the attribute.

18. The system of claim 16, further comprising:
providing a recommendation of the item to the device of the user based on the identified attribute descriptor.

19. A method comprising:
accessing an image that depicts an item, the item depicted in the image having an attribute that describes a characteristic of the item and an attribute descriptor that corresponds to the attribute of the item and specifies a value of the attribute;
performing, using one or more hardware processors, an analysis of the image based on image segmentation of the image, the analysis including:
identifying text on the item within the image, and
identifying the attribute descriptor corresponding to the attribute based on the identified text on the item; and
transmitting a communication to a device of a user based on the identifying of the attribute descriptor corresponding to the attribute of the item depicted in the image.

20. A non-transitory machine-readable storage medium comprising instructions that, when executed by one or more hardware processors of a machine, cause the machine to perform operations comprising:
accessing an image that depicts an item, the item depicted in the image having an attribute that describes a characteristic of the item and an attribute descriptor that corresponds to the attribute of the item and specifies a value of the attribute;
performing an analysis of the image based on image segmentation of the image, the analysis including:
identifying text on the item within the image, and
identifying the attribute descriptor corresponding to the attribute based on the identified text on the item; and
transmitting a communication to a device of a user based on the identifying of the attribute descriptor corresponding to the attribute of the item depicted in the image.

* * * * *